ized, imine-modified, carboxylic acid group-containing acrylic resins can be electrodeposited. These compositions deposit on the cathode to provide coatings having excellent properties.

United States Patent [19]
Dowbenko et al.

[11] 3,953,391
[45] Apr. 27, 1976

[54] CATIONIC ACRYLIC ELECTRODEPOSITABLE COMPOSITIONS

[75] Inventors: Rostyslaw Dowbenko; Wen-Hsuan Chang, both of Gibsonia, Pa.

[73] Assignee: PPG Industries, Inc., Pittsburgh, Pa.

[22] Filed: Mar. 9, 1972

[21] Appl. No.: 233,319

Related U.S. Application Data

[62] Division of Ser. No. 47,860, June 19, 1976, Pat. No. 3,679,564.

[52] U.S. Cl. ............... 260/29.6 TA; 260/29.6 HN; 260/29.6 H
[51] Int. Cl.² ........................................ C08L 33/14
[58] Field of Search ............ 260/29.6 TA, 29.6 HN, 260/29.6 H

[56] References Cited
UNITED STATES PATENTS

| | | |
|---|---|---|
| 3,261,796 | 7/1966 | Simms .................... 260/29.6 TA |
| 3,494,847 | 2/1970 | Yurcheshen et al. ............... 204/181 |
| 3,575,909 | 4/1971 | Gilchrist ..................... 260/29.6 TA |
| 3,652,478 | 3/1972 | Ishii et al. ..................... 260/29.6 TA |
| 3,691,126 | 9/1972 | Walus ..................... 260/29.6 TA |
| 3,697,467 | 10/1972 | Haughney .................... 260/29.6 TA |
| 3,703,596 | 11/1972 | Marx et al. .................. 260/29.6 TA |

*Primary Examiner*—Lucille M. Phynes
*Attorney, Agent, or Firm*—William J. Uhl

[57] ABSTRACT

It has been found that aqueous coating compositions comprising acid-solubilized, imine-modified, carboxylic acid group-containing acrylic resins can be electrodeposited. These compositions deposit on the cathode to provide coatings having excellent properties.

5 Claims, No Drawings

CATIONIC ACRYLIC ELECTRODEPOSITABLE COMPOSITIONS

CROSS-REFERENCE TO RELATED APPLICATIONS

This application is a division of copending application Ser. No. 47,860, filed June 19, 1970 now U.S. Pat. No. 3,679,564, granted July 25, 1972.

BACKGROUND OF THE INVENTION

Electrodeposition as a coating application method involves the deposition of a film-forming material under the influence of an applied electrical potential, and has become of increasing commercial importance. Along with the increased use of such methods has been the development of various compositions which provide more or less satisfactory coatings when applied in this manner. However, most conventional coating techniques do not produce commercially usable coatings, and electrodeposition of many coating materials even when otherwise successful, is often attended by various disadvantages, such as non-uniform coatings and poor throw power. In addition, the coatings obtained are in many instances deficient in certain properties essential to their utilization in certain applications for which electrodeposition is otherwise suited. In particular, properties such as corrosion resistance and alkali resistance are difficult to achieve with resins conventionally employed in the electrodeposition process and many electrodeposited coatings are subject to discoloration or staining because of chemical changes associated with electrolytic phenomena at the electrodes and with the various materials ordinarily utilized. This is especially true with the conventional resin vehicles used in electrodeposition processes which contain carboxylic acid resins neutralized with a base. These deposit on the anode and because of their acidic nature tend to be sensitive to common types of corrosive attack, e.g., by salt, alkali, etc. Further, anodic deposition tends to place the uncured coating in proximity to metal ions evolved at the anode, thereby causing staining.

DESCRIPTION OF THE INVENTION

It has now been found that aqueous coating compositions comprising an acid-solubilized, imine-modified carboxylic acid group-containing acrylic resin can be deposited on a cathode to provide coatings with highly desirable properties. These modified products can be utilized by themselves as the sole film-forming constituent of the coating composition or they can be included in such a composition along with one or more additional film-forming materials.

The compositions of the invention are water-dispersed products made by reacting free carboxylic groups of an acrylic resin containing a multitude of carboxylic groups with an alkyleneimine or substituted alkyleneimine and neutralizing all or part of the resultant product with an acid to provide a product which is soluble or dispersible in water. The term "water-dispersed", as used herein, means dissolved in or dispersed in water so that the resin does not settle upon standing for a reasonable period and acts as a polyelectrolyte under introduced electric current.

Essentially any polycarboxylic acid group-containing acrylic resins can be utilized in the invention. These acrylic resins may be broadly described as interpolymers of esters of unsaturated carboxylic acids, unsaturated carboxylic acids and at least one other ethylenically unsaturated monomer. The acid monomer of the interpolymer is usually acrylic or methacrylic acid but other ethylenically unsaturated monocarboxylic and dicarboxylic acids such as ethacrylic acid, crotonic acid, maleic acid and other acids up to about 6 carbon atoms can also be employed. Ordinarily the acid and ester each comprise about one percent (usually at least about five percent) up to about 20 percent by weight of the interpolymer, with the remainder being made up of one or more copolymerizable ethylenically unsaturated monomers. Most often used are the alkyl acrylates such as ethyl acrylate, butyl acrylate, 2-ethylhexyl acrylate, and the like; the alkyl methacrylates such as methyl methacrylate, butyl methacrylate, lauryl methacrylate, etc., and the vinyl aromatic hydrocarbons such as styrene and vinyl toluene, but others can also be utilized.

Of particular interest are a group of carboxylic acids containing acrylic resins which also contain hydroxyl groups, for example, those described in U.S. Pat. No. 3,403,088, the resin disclosure of which is hereby incorporated by reference. These interpolymers are essentially described above, but in addition contain from about one percent to about 20 percent by weight of a hydroxylalkyl ester of acrylic acid and methacrylic acid or other alpha, beta-ethylenically unsaturated carboxylic acid, for example, hydroxy esters of acrylic or methacrylic acid wherein the hydroxyalkyl group contains up to 5 carbon atoms such as 2-hydroxyethyl acrylate, 2-hydroxypropyl acrylate; 3-hydroxypropyl acrylate, 2-hydroxyethyl methacrylate, 2-hydroxypropyl methacrylate, 3-hydroxypropyl methacrylate, 4-hydroxybutyl methacrylate. Corresponding esters of other unsaturated acids, for exaple, acrylic acid, crotonic acid and maleic acid, and similar acids of up to 6 carbon atoms can also be employed.

Another group of acrylic resins containing carboxyl groups are those which contain etherified methylated derivatives of acrylamide such as those in U.S. Pat. No. 3,247,139, the resin disclosure of which is hereby incorporated by reference. These groups may be introduced into the polymer by employing an acrylamide in the preparation of the interpolymer and then subsequently reacting the resultant amide group with an aldehyde and an alcohol, for example, formaldehyde and butanol; or by employing as a monomer the preformed etherified methylated derivatives of acrylamide such as described in U.S. Pat. No. 3,079,434, which is hereby incorporated by reference.

It is desirable that the interpolymer contain in polymerized form from about 2 percent to about 50 percent of said aldehyde-modified carboxylic acid amide. The remainder of the interpolymer may be made up as set forth above.

The interpolymers described above were produced under the conditions and with catalysts conventionally used in making acrylic polymers. For example, if a catalyst is usually present and the polymerization temperature was generally between about 65°c. and 130°C., or it is desirable to control molecular weight or to produce a relatively low molecular weight interpolymer, there may be employed a chain-transfer agent such as a mercaptan to achieve this result.

Various alkylenimines and substituted alkylenimines can be used to modify the acidic groups in the above polycarboxylic acid resins. These correspond generally to the formula:

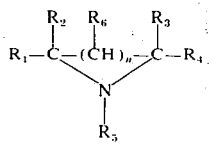

where $R_1$, $R_2$, $R_3$, $R_4$, and $R_5$ are each either hydrogen, alkyl, such as methyl, ethyl, propyl, or the like, having, for example, up to about 20 carbon atoms; aryl, such as phenyl or the like; alkaryl, such as tolyl, xylyl or the like; or aralkyl, such as benzyl phenethyl or the like. $R_6$ in the above formula is hydrogen or a lower alkyl radical usually having not more than about 6 carbon atoms, and $n$ is 0 or 1.

The groups designated by the above formula include substituted radicals of the classes indicated, including substituents such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups, where present. It will be seen that compounds containing certain combinations of the above groups cannot be obtained because of factors such as steric hindrance or intramolecular interaction. For this reason, in most of the compounds of the class described, one and usually several of the groups designated by $R_1$ through $R_6$ will represent hydrogen. However, the efficacy of the various imines within the above formula does not depend upon the particular nature of any of the substituents and thus beneficial results are obtained with interpolymers modified by any of the compounds within the above class.

To exemplify the compounds which can be used, examples of imines within the scope of the formula set forth above are as follows:

Ethyleneimine (aziridine)
1,2-Propyleneimine (2-methylaziridine)
1,3-Propyleneimine (azetidine)
1,2-Dodecyleneimine (2-octylaziridine)
Dimethylethylenimine (2,2-dimethylaziridine)
Tolyl ethylenimine (2-(4-methylphenyl)aziridine)
Benzyl ethylenimine (2-phenylmethylaziridine)
1,2-Diphenylethylenimine (2,2,-diphenylaziridine)
2-Aminoethylethylenimine (2-(2-aminoethyl)aziridine)
2(3-Chloropropyl)ethyleneimine (2-(3-chloropropyl)aziridine)
2-(2-Methoxyethyl)ethylenimine (2-(2-methoxyethyl)aziridine)
Dodecyl 2-aziridinylcarboxylate
2-(2-Carbethoxyethyl)ethylenimine (2-(2-carbethoxyethyl)aziridine)
N-butylethylenimine (1-butylaziridine)
N-(2-aminoethyl)ethylenimine (1-(2-aminoethyl)aziridine)
N-(cyanoethyl)ethylenimine (2-(cyanoethyl)aziridine)
N-phenylethylenimine (1-phenylaziridine)
N-(p-chlorophenyl)ethylenimine (1-(4-chlorophenyl)aziridine)

Because of their availability and because they have been found to be among the most effective, the preferred imines are alkylenimines having 2 to 4 carbon atoms, and especially ethylenimine and 1,2-propyleneimine.

The reaction with the imine takes place upon admixing the imine and the carboxyl-containing material and heating to moderate temperatures, say 50°C. to 150°C., although higher or lower temperatures can be used, depending upon the desired reaction time.

The amount of imine reacted with the free carboxyl groups of the acrylic resins is that amount sufficient to render the resin cationic in character, that is, transportable to a cathode when acid solubilized. Preferably, substantially all of the acidity in the resin is reacted with imine.

The reaction with the imine is preferably carried out during or after the polymerization to produce the polycarboxylic acid resin. While often the imine reaction is carried out with the polycarboxylic acid resin as such, it can also be carried out concurrently with the polymerization reaction, or even with the polycarboxylic acid itself.

Neutralization of these products is accomplished by the reaction of all or part of the amino groups by an acid, for example, formic acid, acetic acid, or phosphoric acid or the like. The extent of neutralization depends upon the particular resin and it is only necessary that sufficient acid be added to solubilize or disperse the resin as desired.

In order to enhance or modify the properties of the imine-modified resin of the invention, the resins may be utilized in formulations wherein up to 50 percent, usually up to 40 percent, by weight, of the resin is replaced with a co-reactive organic compound or resin co-reactive with the amine, carboxyl, hydroxyl or aldehyde-modified amide groups contained in the resin. A particularly useful coreactive material comprises capped or blocked isocyanates.

In the preparation of the blocked organic polyisocyanate, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylenemethane, 2,4- or 2,6-tolylene, or mixtures thereof, 4,4'-toluidine and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4'-4''-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate terminated prepolymers may be simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like, with alkylene oxides such as ethylene oxide, propylene oxide, their mixtures, and the like.

Any suitable aliphatic, cycloaliphatic or aromatic alkyl monoalcohol may be used as a blocking agent in accordance with the instant invention, such as, for example, aliphatic alcohols, such as methyl, ethyl, chloroethyl, propyl, butyl, amyl, hexyl, heptyl, octyl, nonyl, 3,3,5-trimethylhexanol, decyl, and lauryl alcohols and the like; the cycloaliphatic alcohols such as, for example, cyclopentanol, cyclohexanol, and the like, the aromatic-alkyl alcohols, such as phenylcarbinol, methylphenylcarbinol and the like. Minor amounts of even higher molecular weight, relatively non-volatile monoalcohols may be used, if desired, to serve as plasticizers in the coatings provided by this invention.

Additional blocking agents include hydroxyl tertiary amines such as diethyl ethanolamine and oximes such as methylethyl ketone oxime, acetone oxime and cyclohexanone oxime.

The organic polyisocyanate-blocking agent adduct is formed by reacting a sufficient quantity of alcohol with the organic polyisocyanate to insure that no free isocyanate groups are present. The reaction between the organic polyisocyanate and the blocking agent is exothermic, therefore the polyisocyanate and the blocking agent are preferably admixed at temperatures no higher than 80°C. and, preferably, below 50°C. to minimize the exotherm effect.

The polyisocyanate-blocking agent adduct is preferably admixed with the compound containing primary and/or secondary amine groups in ratios of from about 0.5 to about 2.0 blocked isocyanate groups for each amine group. When the mixture is heated to curing temperatures, it is theorized that a urethane-amine complex is formed prior to the splitting out of the alcohol, which prevents the loss of monomeric polyisocyanate.

The capped isocyanate amine resin mixture is applied to suitable substrates and cured at elevated temperatures, such as from about 250°F. to about 600°F. At these higher temperatures, the reactivity of the amine groups is such to enable it to break the urethane link of the adduct and react with the freed NCO groups to form a substituted urea. The alcohol released may either volatilize or remain in the mixture as a plasticizer, depending essentially on its boiling point. Furthermore, it has been found that isocyanate groups are liberated in a manner which indicates that in addition to the amine groups, products of the amine and isocyanate reaction can break the urethane bond of the adduct.

The coating composition comprising the above modified products are dispersed in water. The concentration depends upon the use intended and, in general, is not critical. For electrodeposition purposes, the major proportion of the dispersed composition is water, that is, the composition may contain from about one to about 25 percent by weight of the resin. In most instances, the pigment composition and, if desired, various additives such as antioxidants, surface-active agents and the like are included. The pigment composition may be of any conventional type comprising, for example, iron oxide, lead oxide, strontium chromate, carbon black, titanium dioxide, talc, barium sulfate, as well as color pigments such as cadmium red, chromic yellow, and the like.

The water-dispersed compositions of the invention can be applied by various methods. Because compositions which can be electrodeposited are especially valuable, emphasis is placed here on the utility of the water-dispersed coating compositions, in electrodeposition processes. However, it should be noted that these compositions can also be applied by any conventional means such as brushing, rolling or dipping. The use of these water-dispersed compositions as a dip primer is advantageous in many instances, thus it is not intended that the invention be limited by the discussion in the examples herein relating to the electrodeposition, although the utility of these compositions in such processes makes them especially valuable.

In electrodeposition processes employing the water-dispersed coating compositions described above, the aqueous coating composition is placed in contact with an electrically conductive anode and an electrically conductive cathode with the surface to be coated being the cathode. Upon passage of the electric current between the anode and the cathode in contact with the coating composition, an adherent film of the coating composition is deposited on the cathode. The conditions under which the electrodeposition step herein is carried out are those conventionally used for the electrodeposition of coatings.

The method of the invention is applicable to coating any conductive substrate, such as steel, aluminum, copper and the like.

Illustrating the invention are the following examples which are, however, not to be construed as limiting the invention to their details. All parts and percentages in the examples, as well as throughout the specification are by weight unless otherwise specified.

EXAMPLE I

Into a reactor was charged 210 parts of Pent-Oxone (4-methoxy-4-methyl pentanone-2), which was heated to 123°C. Through a dropping funnel there was added to the reactor a mixture of 60 parts of a solution of N-butoxymethylacrylamide (61.5 percent solids in 9 percent xylene and 91 percent butanol), 445 parts of methyl methacrylate, 15 parts of acrylic acid, 180 parts of ethyl acrylate, 12 parts of Vazo (azobisisobutyronitril) and 3 parts of tertiary dodecyl mercaptan. This mixture was added to a reactor over a 5-hour period, allowing reflux. There was then added 3 parts of Vazo dissolved in 51 parts of Pent-Oxone. This addition required 30 minutes. The reaction mixture was then cooled to 90°c. and 18.1 parts of N(2-hydroxyethyl)e- thyleneimine was added and the reaction maintained at 90°C. After 2 hours, another 5 parts of N-(2-hydroxyethyl)ethyleneimine was added and the reaction mixture maintained at 90°C. for an additional 3-½ hours, at which time the reaction was terminated and cooled. The reaction mixture comprised 51.9 percent solids and a Gardner-Holdt viscosity of J-K.

EXAMPLE II

Into a reactor equipped with a condenser, stirrer, thermometer and dropping funnel where was charged 600 grams of Pent-Oxone, which was heated to reflux (145°C.). There was then added over a period of 5 hours, maintaining reflux, a mixture comprising 892 parts of methyl methacrylate, 144 parts of methacrylic acid, 1008 parts of butyl methacrylate and 835 parts of 2-ethylhexyl acrylate, along with 28.8 parts of tertiary dodecyl mercaptan and 43.2 parts of Vazo. After this addition, an additional 14.4 parts of Vazo dissolved in 120 parts of Pent-Oxone were added to the reaction mixture over a period of 25 minutes, while maintaining reflux. At a temperature of 116°C. there was then added 160 parts of N-(2-hydroxyethyl)ethyleneimine over a period of 20 minutes. The reaction mixture was then maintained at 100°C. for 2 hours. The reaction mixture comprised 79.3 percent solids with a viscosity of Z-10.

EXAMPLE III

Into a reactor equipped with a condenser, stirrer, thermometer, and dropping funnel there was charged 40 parts of xylene and 40 parts of Pent-Oxone and heated to reflux (145°C.). There was then added to the reactor over a period of 5 hours a mixture of 57.6 parts of methacrylic acid, 168 parts of methyl methacrylate, 138.2 parts of butyl methacrylate, 115.2 parts of 2-ethylhexyl acrylate, along with 4.8 parts of tertiary dodecyl mercaptan and 16.8 parts of Vazo.

There was then added 2.4 parts of Vazo and 20 parts of xylene and 20 parts of Pent-Oxone through the dropping funnel over a period of 25 minutes. The reaction mixture was slowly cooled to 90°C., 50.2 parts of ethyleneimine were then added. The reaction mixture was maintained at 90°C. for an additional 2 hours, the reaction was then cooled. The product had an acid number of 0.225 and the solids content of 80.4 percent and a viscosity of Z-10.

EXAMPLE V

The amine group-containing resin employed in this example was an acrylic resin reacted with 8.8 percent propyleneimine, 13.7 percent methacrylic acid, 27.4 percent styrene and 50.1 percent butyl acrylate utilized as a 76 percent solution in Pent-Oxone, viscosity 175,000 centipoises.

A pigment paste was prepared having a Hegman grind of 7+ containing 6000 parts red iron oxide, 375 parts lead silicate, 125 parts of strontium chromate, 143 parts of a cationic surfactant (Aerosol C-61, a mixture of octadecyl amine and octadecyl guanidine salts of octadecyl carbamic acid reacted with ethylene oxide, 70 percent in isopropanol water mixture) and 1007 parts deionized water.

An electrodepositable composition was prepared containing:

|  | Parts by Weight |
| --- | --- |
| Pigment paste (above) | 137.5 |
| Acrylic resin (above) | 237.0 |
| Capped isocyanate | 66.0 |
| Acetic acid (36 percent) | 28.0 |
| Deionized water | to reduce to 10 percent solids |

The pH of the electrodeposition bath was 60 with a specific conductivity of 1250 mohs. Zinc phosphatized steel panels were coated at 200 volts for 2 minutes. 0.8 mil film thickness, baked for 20 minutes at 400°F., pencil hardness 2H, impact resistance greater than 160 inch/lbs., a smooth gloss film. The coating withstood 250 hours salt spray with 2–3 mm. crrepage from a scribe. 250 hour humidity results were excellent.

Similar results to those of the above examples are obtained by substituting therein various other amine resins or blocked polyisocyanates such as those hereinabove described, also variation in the procedure employed within limits discussed above can be used with satisfactory results.

According to the provisions of the Patent Statutes, there are described above the invention and what are now considered its best embodiments; however, within the scope of the appended claims, it is understood that the invention can be practiced otherwise than as specifically described.

We claim:

1. An aqueous electrodeposition bath comprising an aqueous dispersion of a coating composition comprising an acid solubilized interpolymer prepared by reacting at least a portion of the carboxyl groups of an interpolymer, prepared from an ethylenically-unsaturated carboxylic acid and at least one other ethylenically-unsaturated monomer, with an imine of the formula:

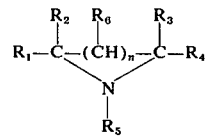

where $R_1$, $R_2$, $R_3$, $R_4$ and $R_5$ are each hydrogen, alkyl, aryl, alkaryl or aralkyl, $R_6$ is hydrogen or a lower alkyl radical, usually not having more than 6 carbon atoms, and $n$ is 0 or 1.

2. A composition as in claim 1 wherein the interpolymer reacted with said imine is an interpolymer of an ester of an unsaturated carboxylic acid, an unsaturated carboxylic acid and at least one other ethylenically-unsaturated monomer.

3. A composition as in claim 2 wherein the interpolymer is an interpolymer of a hydroxyalkyl ester of an unsaturated carboxylic acid, an unsaturated carboxylic acid and at least one other ethylenically-unsaturated monomer.

4. A composition as in claim 2 wherein the interpolymer is an interpolymer of an etherified methylolated derivative of acrylamide, an unsaturated carboxylic acid and at least one other ethylenically unsaturated monomer.

5. A composition as in claim 1 wherein said imine is an alkylenimine of 2 to 4 carbon atoms.

* * * * *